(12) United States Patent
Huels et al.

(10) Patent No.: US 9,764,863 B2
(45) Date of Patent: Sep. 19, 2017

(54) HEAT SEALING THRU FOOD CONTAMINANTS

(71) Applicant: SILGAN PLASTIC FOOD CONTAINERS INC., Union, MO (US)

(72) Inventors: Edward Huels, Union, MO (US); William Krone, Washington, MO (US); James Lucken, Wildwood, MO (US); Huy Thach, Union, MO (US)

(73) Assignee: SILGAN PLASTIC FOOD CONTAINERS CORPORATION, Union, MO (US)

( * ) Notice: Subject to any disclaimer, the term of this patent is extended or adjusted under 35 U.S.C. 154(b) by 0 days.

(21) Appl. No.: 14/790,275

(22) Filed: Jul. 2, 2015

(65) Prior Publication Data

US 2015/0298831 A1    Oct. 22, 2015

Related U.S. Application Data

(63) Continuation of application No. 12/753,036, filed on Apr. 1, 2010, now Pat. No. 9,073,681.

(51) Int. Cl.
*B65D 41/00* (2006.01)
*B65B 3/10* (2006.01)
(Continued)

(52) U.S. Cl.
CPC ............... *B65B 3/10* (2013.01); *B29C 65/18* (2013.01); *B29C 65/7841* (2013.01);
(Continued)

(58) Field of Classification Search
CPC ......... B29C 65/18; B29C 65/48; B29C 65/46; B29C 65/76; B29C 65/7841;
(Continued)

(56) References Cited

U.S. PATENT DOCUMENTS 3,491,935 A    1/1970  Trotter, Jr. et al.
3,547,338 A   12/1970  Hemmes
(Continued)

FOREIGN PATENT DOCUMENTS

EP   2055641    5/2009
JP   02233380   9/1990

OTHER PUBLICATIONS

U.S. Patent and Trademark Office, The International Search Report and the Written Opinion of the International Searching Authority, or the Declaration, Search Report and Written Opinion, Jun. 1, 2011, pp. 1-19, The United Patent and Trademark Office, U.S.

*Primary Examiner* — J. Gregory Pickett
*Assistant Examiner* — Niki M Eloshway
(74) *Attorney, Agent, or Firm* — Middleton Reutlinger

(57) ABSTRACT

A container is provided with a flange defining a container opening that may help expunge food product as the film and seal head comes down on the container flange. The flange of the container opening has a predetermined angle. The container flange with its sealing surface generally deflects or angularly pivots when sealed with the film during the sealing process. The container flange and film may push product contamination from the sealing surfaces inwardly into the container. The flange may be continuous about the periphery of the container opening.

32 Claims, 5 Drawing Sheets

(51) Int. Cl.
  *B29C 65/18* (2006.01)
  *B29C 65/78* (2006.01)
  *B29C 65/00* (2006.01)
  *B65B 7/16* (2006.01)
  *B65B 7/28* (2006.01)
  *B65B 51/14* (2006.01)
  *B65D 77/20* (2006.01)
  *B65D 43/02* (2006.01)
  *B65D 17/34* (2006.01)
  *B29C 65/46* (2006.01)
  *B29C 65/48* (2006.01)
  *B29C 65/76* (2006.01)

(52) U.S. Cl.
  CPC .......... *B29C 66/112* (2013.01); *B29C 66/131* (2013.01); *B29C 66/242* (2013.01); *B29C 66/53461* (2013.01); *B29C 66/7373* (2013.01); *B29C 66/81427* (2013.01); *B29C 66/81431* (2013.01); *B29C 66/8322* (2013.01); *B29C 66/8491* (2013.01); *B65B 7/164* (2013.01); *B65B 7/28* (2013.01); *B65B 7/2871* (2013.01); *B65B 51/14* (2013.01); *B65D 43/0202* (2013.01); *B65D 77/2024* (2013.01); *B29C 65/46* (2013.01); *B29C 65/48* (2013.01); *B29C 65/76* (2013.01); *B29C 66/71* (2013.01); *B29C 66/742* (2013.01); *B29C 66/7422* (2013.01); *B29C 66/74283* (2013.01); *B65D 2543/00953* (2013.01)

(58) Field of Classification Search
  CPC ... B29C 66/112; B29C 66/131; B29C 665/48; B29C 66/53461; B29C 66/71; B29C 66/7373; B29C 66/742; B29C 66/7422; B29C 66/74283; B29C 66/81427; B29C 66/81431; B29C 66/8322; B29C 66/8491; B65B 3/10; B65B 7/2871; B65D 43/0202; B65D 2543/00953
  USPC .......... 220/359.1, 359.4, 359.2, 305
  See application file for complete search history.

(56) References Cited

U.S. PATENT DOCUMENTS

| | | |
|---|---|---|
| 3,580,464 A | 5/1971 | Griffith |
| 3,732,909 A | 5/1973 | Rooke et al. |
| 4,243,144 A * | 1/1981 | Margulies ............ B65D 75/327 206/469 |
| 4,294,361 A | 10/1981 | Margulies et al. |
| 4,397,401 A | 8/1983 | Ueno et al. |
| 4,588,621 A | 5/1986 | Bunel et al. |
| 4,693,391 A | 9/1987 | Roth |
| 4,695,337 A | 9/1987 | Christine |
| 4,865,217 A | 9/1989 | Yoshimoto |
| 4,867,336 A | 9/1989 | Stewart |
| 4,890,759 A | 1/1990 | Scanga et al. |
| 5,034,074 A | 7/1991 | Thomas, Jr. |
| 5,039,001 A | 8/1991 | Kinigakis et al. |
| 5,156,286 A | 10/1992 | Piccard |
| 5,367,856 A | 11/1994 | Kirk et al. |
| 5,428,943 A | 7/1995 | Balcombe |
| 5,492,703 A | 2/1996 | Gics |
| 5,709,308 A | 1/1998 | Gics |
| 5,868,264 A | 2/1999 | Fulford et al. |
| 6,085,942 A | 7/2000 | Redmond |
| 6,802,919 B2 | 10/2004 | Massey et al. |
| 7,422,125 B2 | 9/2008 | Winberg |
| 7,549,540 B2 | 6/2009 | Lee et al. |
| 7,703,626 B2 | 4/2010 | Witt |
| 8,240,501 B2 * | 8/2012 | Claydon ............ B65D 79/005 220/213 |
| 8,287,220 B2 * | 10/2012 | Oberholzer .......... B21D 51/443 156/221 |
| 2002/0050493 A1 * | 5/2002 | Ball .................... B65D 17/502 220/359.2 |
| 2002/0125252 A1 | 9/2002 | Massey et al. |
| 2003/0192893 A1 | 10/2003 | Weder |
| 2004/0118852 A1 | 6/2004 | Barmore et al. |
| 2005/0000965 A1 | 1/2005 | Boardman |
| 2006/0151503 A1 * | 7/2006 | Claydon ............ B65D 79/005 220/359.1 |
| 2006/0191940 A1 | 8/2006 | Heyn |
| 2007/0181577 A1 | 8/2007 | Jones, Jr. |
| 2008/0073366 A1 | 3/2008 | Backaert |
| 2009/0321462 A1 | 12/2009 | Hui |

\* cited by examiner

HEAT SEALING THRU FOOD CONTAMINANTS

TECHNICAL FIELD

The present invention relates to a container and particularly to a container with a flange adjacent the container opening.

DETAILED DESCRIPTION

Figure 1:
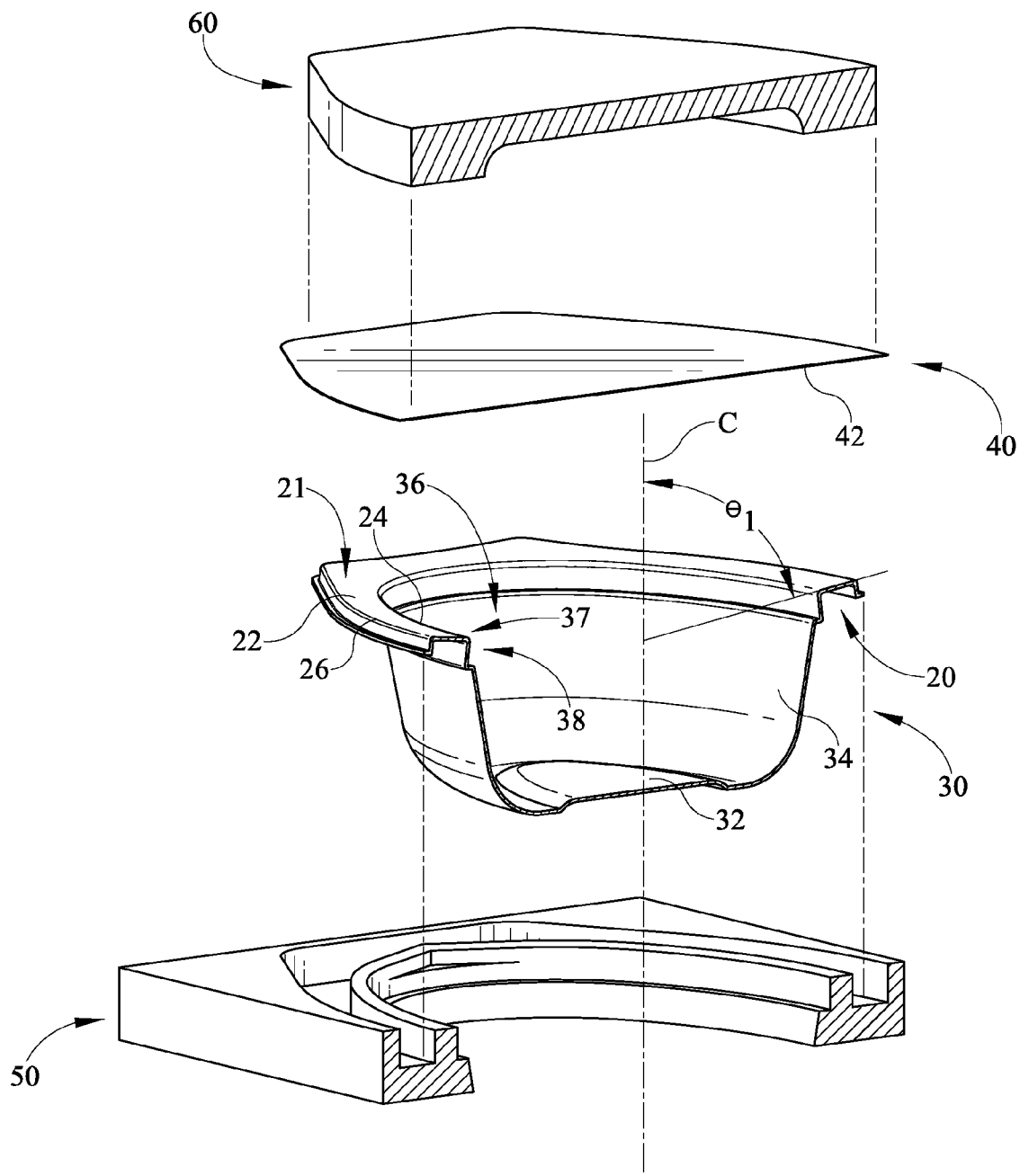
FIG. 1 is an exploded, perspective sectional view of one embodiment of the container during the sealing process.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," "in communication with" and "mounted," and variations thereof herein are used broadly and encompass direct and indirect connections, couplings, and mountings. In addition, the terms "connected" and "coupled" and variations thereof are not restricted to physical or mechanical connections or couplings.

Furthermore, and as described in subsequent paragraphs, the specific mechanical configurations illustrated in the drawings are intended to exemplify embodiments of the invention and that other alternative mechanical configurations are possible.

As shown in FIGS. 1-5, one embodiment of a container or tray 30 is provided with a flange 20 which facilitates the removal of contaminants from the sealing surfaces during the sealing process of the container. During the filling process, product or food contaminant 2 is sometimes present on the sealing surfaces between the container 30 and a film or sealing member 40. Product contaminant 2 may become entrapped between the film sealing surfaces 42 and the container sealing surfaces 22 thereby compromising the integrity of the seal engagement. The embodiments of the invention may reduce or prevent the product contaminant from interfering with the sealing surfaces of the container and film.

As shown in FIGS. 1-5, container 30 includes flange 20 defining an opening 36 of the container. Container 30 includes a bottom wall 32 with a sidewall 34 projecting upwardly therefrom. Flange 20 projects from a rim 37 of sidewall 34 thereby defining the container opening 36. Before sealing, flange 20 is positioned at a predetermined angle $\theta_1$ (FIGS. 1-4) from central axis C of container opening 36. However, the flange angle may also be measured from a variety of devices or other container structures, such as but not limited to sidewall 34, rim 37, or bottom wall 32. As shown, flange 20 continuously surrounds the container opening 36, however it should be understood that the flange may only extend partially about the periphery of the container rim or can be discontinuous about the opening. In addition, container opening 36 may be provided in a variety of shapes, sizes, quantities, positions, and construction within the container.

Container 30 may be constructed by a variety of methods including but not limited to thermoform, injection, or compression molding. The container may be formed of a rigid, flexible, or semi-rigid material, such as a polymeric material including but not limited to polyethylene, polypropylene, or some other material or combination of materials commonly known to one of ordinary skill in the art. Moreover, container 30 may be formed in a variety of sizes and shapes depending on the desired use of the container associated therewith. As will be recognized by those skilled in the art, a variety of closures and/or sealing members or other devices may also be used with the container.

Figure 2:
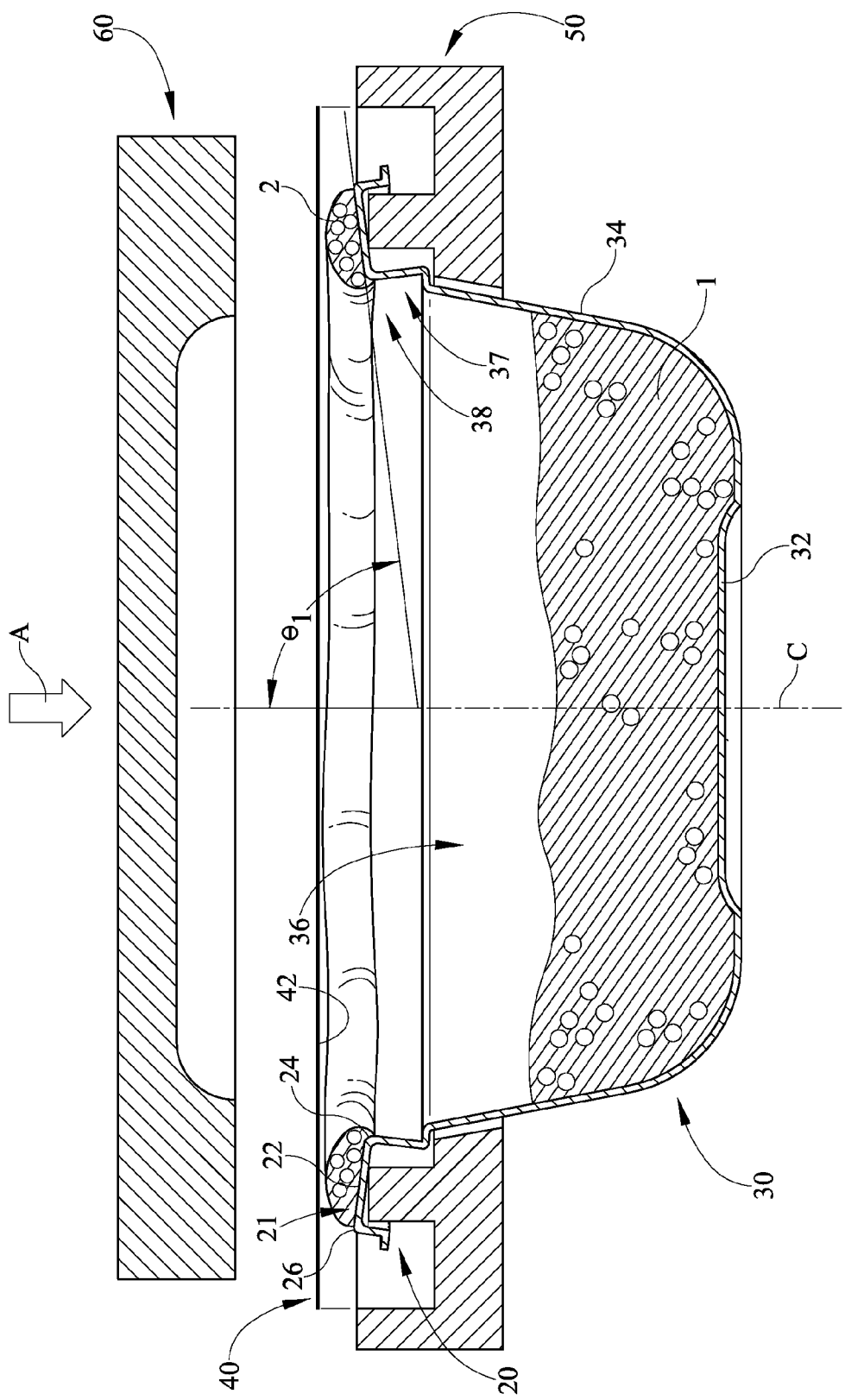
FIG. 2 is a sectional view of the embodiment of FIG. 1 with the container in the filled condition and the film and seal bar exploded away from the container.
Figure 5:
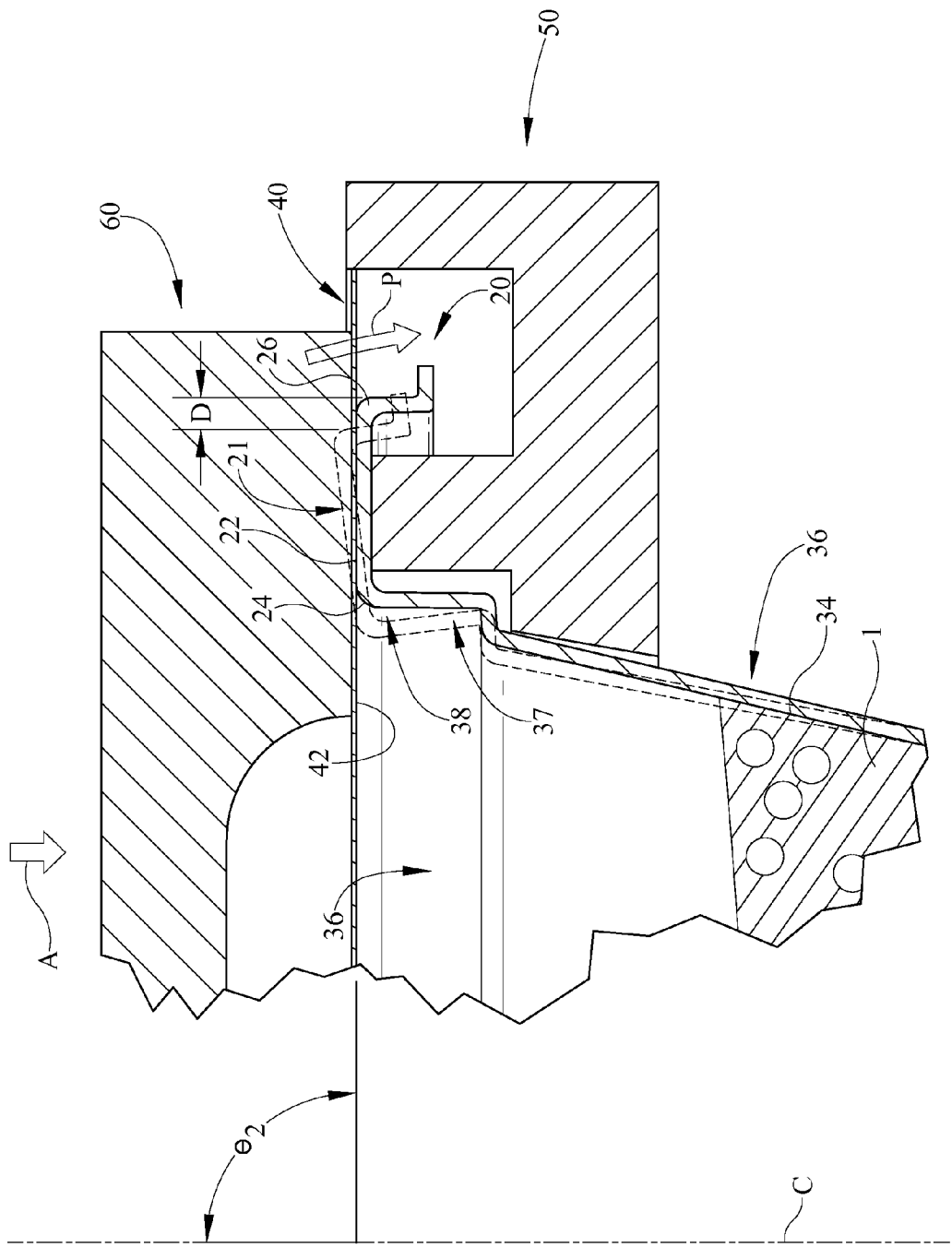
FIG. 5 is an enlarged, partial sectional view of the embodiment of FIG. 4 illustrating the film and seal bar fully engaging the flange of the container, the position of the container before the film and seal bar is fully engaged is shown in broken lines.

As shown in FIGS. 1 and 2, container flange 20 is molded at a predetermined angle $\theta_1$ as measured relative to central axis C of the container opening 36. Flange 20 projects upwardly and outwardly away from opening 36 thereby presenting a substantially conical shape along the surface thereof. Flange 20 includes a sealing surface 22 on an angled or inclined top surface 21 thereof. Sealing surface 22 extends from an outer edge 26 to an inner edge 24 of top surface 21. Although sealing surface 22 of flange 20 substantially extends across the entire top surface 21 of the flange as shown in FIG. 5, sealing surface 22 may only partially extend over top surface 21, or may extend over a combination of surfaces of the flange, or may possibly present a sealing surface on a portion of the interior or exterior of the sidewall. The sealing surface 22 of flange 20 also does not have to be at a single continuous angle, the surface or flange may be a variety of shapes, sizes, or configurations, such as but not limited to arcuate or multiple inclines, and still be substantially angled and pivotable.

As shown in FIGS. 1-5, flange 20 includes a hinge or angular pivot 38 adjacent the container opening 36. Flange 20 is substantially resilient and in a relaxed, unflexed first state (FIGS. 1-4) before engaging with film 40. However, upon placement of film 40 onto the flange of the container during assembly, specifically when the film initially engages sealing surface 22 at outer edge 26 of the flange, the flange is deformed or pivoted into a tensioned, flexed second state (FIG. 5) in which the flange angular flexes about hinge 38. Therefore, the container may be substantially rigid while the hinge allows for pivoting of the flange. Specifically, flange 20 is progressively pivoted or flexed as film 40 is progressively applied from outer edge 26 of the flange sealing surface 22 towards inner edge 24 of the flange sealing surface 22. Flange 20 is positioned at first angle $\theta_1$ in the first position before engagement of the film 40 and angularly pivots into a second angle $\theta_2$ (FIG. 5) upon flexing into the second position, whereby the first angle is smaller than the second angle. First angle $\theta_1$ may be an acute angle. The first angle $\theta_1$ is shown as approximately 83 degrees from central axis C. When in the second position, flange 20 may be, but is not limited to, substantially perpendicular to central axis C and therefore second angle $\theta_2$ may be approximately 90 degrees. Therefore the flange may pivot, but is not limited to, within the range greater than 0 degrees to about 90 degrees. In addition, flange 20 alone or in combination with the sidewall 34, or portions of the flange may flex or pivot resulting in the flange repositioning between the first and second positions. Therefore, the container or portions of the container 30 may be flexible, or in particularly the flange of the container is cable of flexing or pivoting relative to its hinge or pivot on the container upon placement of film 40 during the sealing process. Further, in the second state or flexed position (FIG. 5), the flange 20 of container 30 may have a living memory urging the flange back toward its unflexed or first position (FIGS. 1-4) upon being sealingly engaged with the film. However, upon being sealingly engaged with film 40, container flange 20 may remain substantially at its second angle $\theta_2$ in the second position or reposition to a variety of predetermined angles.

Figure 3:
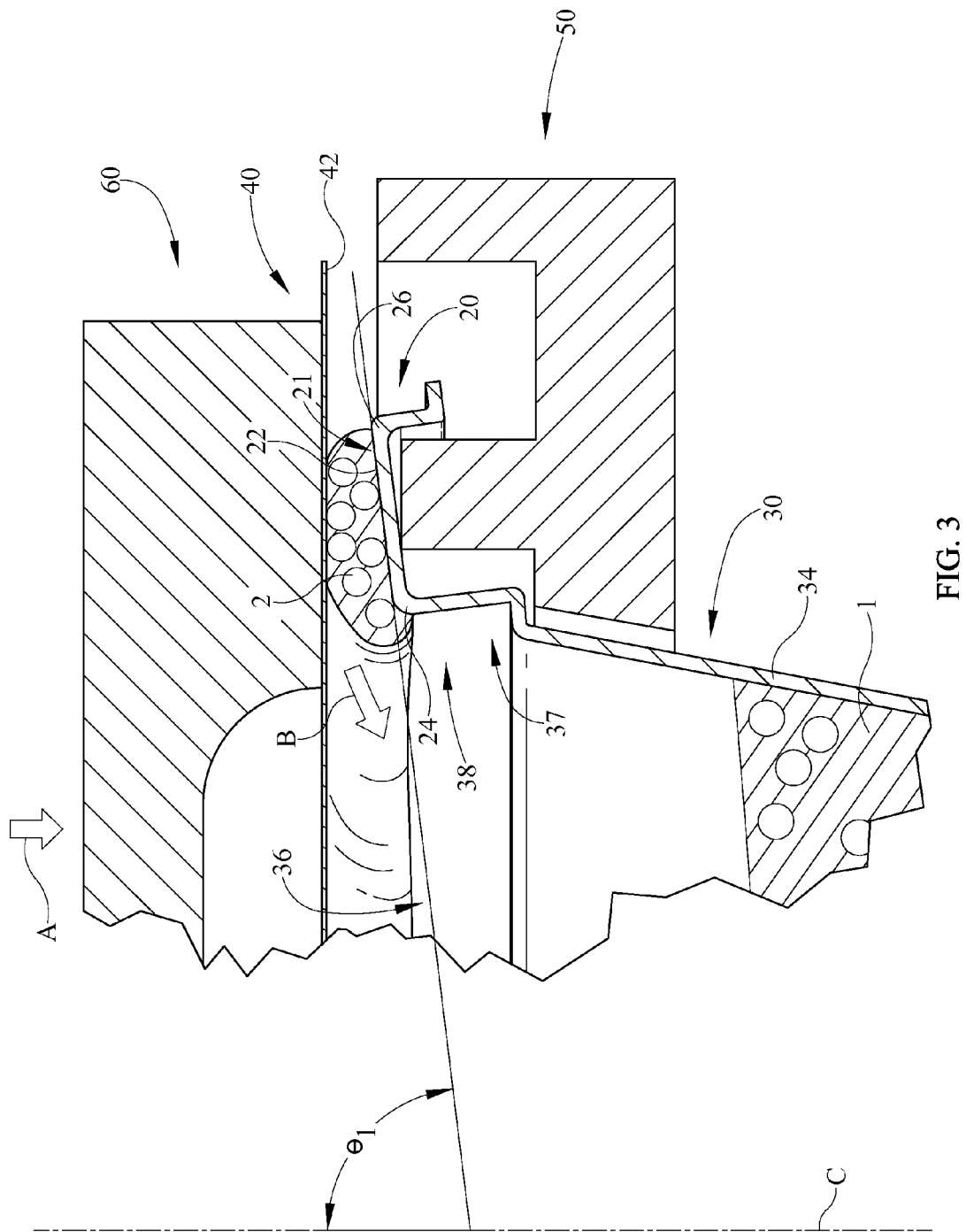
FIG. 3 is an enlarged, partial sectional view of the embodiment of FIG. 2 illustrating the film and seal bar progressing towards the container.
Figure 4:
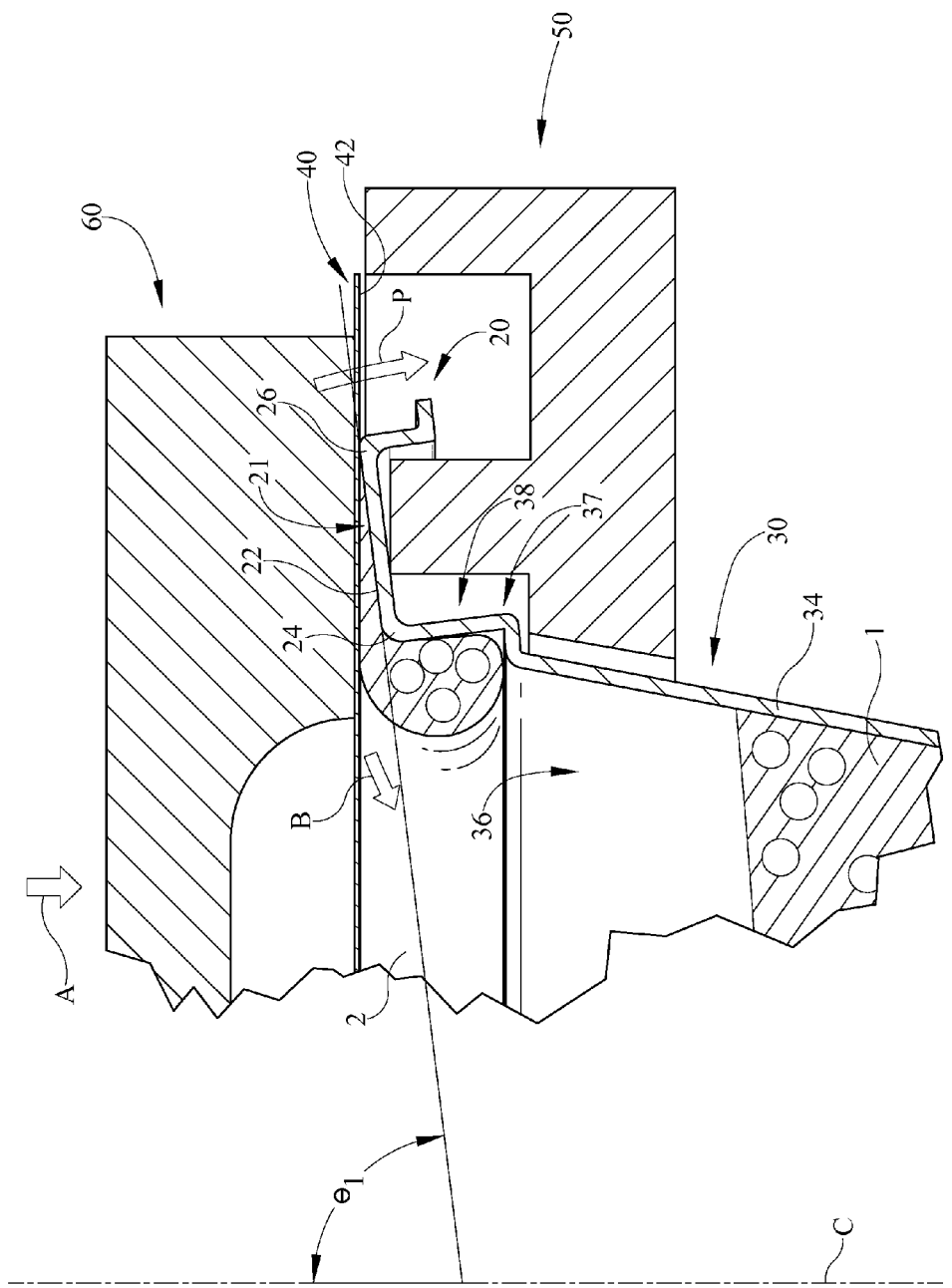
FIG. 4 is an enlarged, partial sectional view of the embodiment of FIG. 3 illustrating the film and seal bar further progressing towards the container.

FIGS. 1-5 illustrate the sealing process of container 30 whereby contaminants 2 positioned between sealing surfaces 22, 42 of flange 20 and film 40, respectively, are squeezed or removed from the contacting sealing surfaces. The product contaminant 2 may be exaggerated in size in the figures to illustrate the exclusion of the container product 1 from flange 20 when film 40 is applied thereto. As is illustrated in FIGS. 2-4, product 1 has been filled in container 30 with contaminants 2 present on flange sealing surfaces 22. The container product 1 may be a variety of materials that can range from liquid, semi-solid, to solid. A fill nest 50 maintains the position of filled container 30 while a seal bar 60 and film 40 vertically travel downward in direction A towards engagement with the container. As illustrated in FIGS. 2-4, seal bar 60 and film 40 continuously progress in direction A until film 40 comes into direct contact with outer edge 26 of flange 20. In the progress (FIGS. 3-5) at least a portion of the contaminants 2 are gradually squeezed or pushed inwardly into container 30 in the downwardly and/or inwardly direction B as seal bar 60 applied pressure between the film 40 and the angled flange 20. Although it is not shown in FIGS. 3 and 4, the downward force placed upon contaminants 2 may also begin pivoting the flange 20 about the hinge 38. Continuing the downward force of the sealing process, allows the seal bar 60 and film 40 to transfer downward force to outer edge 26 of flange 20 thereby beginning angular rotation of the flange about hinge 38 in the direction P as shown in FIG. 4. Thus as seal bar 60 and film 40 continue downwardly, flange 20 angularly flexes and pivots about its hinge 38 while the contact between the film and flange progressively increases from outer edge 26 towards inner edge 24, or in the B direction, until the flange pivots to the second position which may be, but is not limited to, substantially perpendicular to central axis C of container opening 36, or parallel to the film 40 and at the same time progressively squeezing contaminants 2 inwardly into container 30. This acts to reduce the likelihood of failure to sufficiently seal the film 40 to flange 20 as a result of undesirable contaminants on flange 20. While in the second position (FIG. 5), the full force of seal bar 60 is applied wherein heat from the seal bar transfers heat to the interface of film 40 and flange 20 to sealingly engage the film to the container thereby enabling proper sealing of product 1 within the container.

Additionally, as the seal bar 60 and film 40 transfers downward force to pivot flange 20 from its first position (FIG. 4) to its second position (FIG. 5), the flange and/or portions of the container may translationally move or flex relative to the film due to the angle between the flange and the film. As outer edge 26 of container flange 20 is pushed downward by film 40 and seal bar 60, there may be relative movement between the film and the container flange whereby the container flange travels a distance D. This relative movement of container flange 20 is shown as, but is not limited to, translating outwardly away from central axis C for a distance D or in the opposite direction that the contaminants 2 are being squeezed or pushed inwardly in the B direction. Further, heat may begin to transfer from seal bar 60 through film 40 and into the flange 20 as contact is made. Since contact is made initially on the outer edge 26 of the flange, more heat is transferred to the outer edge of the flange relative to the inner edge 24 of the flange. This additional heat transferred to the outer portion of the flange may melt a portion of the polymer of film 40 and/or flange 20 while there is relative motion between the film and flange. The relative movement between film 40 and flange 20 while the flange and/or film polymer is melted may assist in breaking up any continuous layer of contaminant residue separating the film from the flange.

When the film 40 is fully engaged with container flange 20, induction heating can be used to seal the film 40 upon container 30, but other suitable methods of bonding a sealing member to the container may also be used. Film 40 may be replaced by a metal disc sealing member which may be made suitable for bonding to the container flange by induction heat sealing, if a thermally responsive adhesive is applied to the bottom surface of the metal disc in position to seal to the container flange around the container opening. Other sealing members, such as a more rigid plastic or a composite member of plastic and metal, may also be suitable. The sealing member may be semi flexible as well as substantially rigid. The sealing member may also be of a composition capable of undergoing retort and/or aseptic processes. Accordingly, the sealing member may be comprised of any material or of layers of material such as, for example, polyethylene terephalate (PET), polyethylene (PE), Nylon, polypropylene (PP), polyvinylchloride (PVC), styrene, ethylene-vinyl-acetate (EVA), ethylene-vinyl-alcohol (EVOH), Santoprene, Vinyl, foams of the preceding materials, paper, metallic material such as aluminum or steel, or any other material or combinations thereof suitable for sealing to the container, and may be provided in a variety of shapes to match the shape of the container. The sealing member may be a single layer or a multilayered film, either connected by adhesives or co-extruded entirely or partially. The sealing member may be peelable, completely or partially from the container, either by a user gripping and pulling or pushing off the sealing member, or by use of a closure, or it may be nonpeelable whereby the user may puncture or tear the sealing member with a tool, finger, or closure. Further the sealing member may be flexible so that the seal bar 60 provides the rigidity to apply the downward force sufficient to pivot flange 20 into the second position. However, the sealing member does not have to be substantially flexible. It is contemplated that the sealing member may be sufficiently rigid by itself to transfer force to the flange. For instance, the sealing member may be applied by itself or in combination with a closure to the container or tray and still perform the function of deflecting or pivoting the flange as it sealingly engages the container.

Although, the product contaminants 2 are shown to be squeezed inwardly into the container, different containers and films may involve different applications or sealing processes. Thus, it may be advantageous to pivot or flex the flange in the opposite direction to that shown in the drawings, thereby having the film engage the inner edge progressively towards the outer edge of the flange and squeezing product away from the container opening. Alternatively, the pivoting or flexing of the flange may be utilized to squeeze product in both directions, inwardly and outwardly from the container opening. For example, the sealing surface of the flange may be triangular, truncated triangular, or curved in shape, whereby the film or other sealing member applies downward force to the center, or midpoint, and progressively engages the other surfaces of the flange from the center outwardly in opposing directions while pivoting or flexing the flange to a substantially perpendicular position.

It is understood that while certain embodiments of the invention have been illustrated and described, it is not limited thereto except insofar as such limitations are included in the following claims and allowable functional equivalents thereof.

We claim:

1. A container structured to be sealed by a sealing member having a sealing surface comprising:
    a container having a projecting flange and an opening, said opening surrounded at least partially by said projecting flange, wherein said projecting flange includes a complementary sealing surface, said sealing surface having a proximal end adjacent said opening and an opposing distal end, said flange being pivotable between a first position and a second position, wherein said complementary sealing surface of said flange is at a first angle relative to the central axis of said container opening when said flange is in said first position such that said distal end of said sealing surface is positioned above said proximal end of said sealing surface relative to said opening, and said complementary sealing surface of said flange is at a second angle relative to the central axis of said container opening when said flange is in said second position;
    said first angle being transverse to the central axis of said container opening and said second angle being about ninety degrees to the central axis of said container opening, wherein said first angle in said first position is smaller than said second angle in said second position; and
    said container includes a hinge connecting said flange to said container, said flange being pivotable about said hinge between said first and second positions.

2. The container as in claim 1 wherein said first angle is a predetermined acute angle.

3. The container as in claim 1 wherein said complementary sealing surface of said flange is substantially parallel to a sealing surface of a sealing member when in said second position after application of said sealing member to said container.

4. The container as in claim 1 wherein said flange is in a flexed or tensioned state when in said second position.

5. The container as in claim 1 wherein a portion of said flange surrounding said container opening is positionable between said first position and said second position.

6. The container as in claim 1 further including a sealing member, wherein a portion of said sealing member is metallic.

7. The container as in claim 6 wherein said sealing member is heat sealed with said container flange when said container flange is in said second position.

8. A container comprising:
    a container having a flange, a bottom wall, and a sidewall, said sidewall projects from said bottom wall, wherein said flange extends from said sidewall, said sidewall defining an opening at least partially surrounded by said flange outwardly and upwardly projecting therefrom, wherein said flange pivots relative to said sidewall between a tensioned position and an untensioned position;
    when in said untensioned position said flange is positioned at a predetermined acute angle from the central axis relative to said container opening thereby defining a conical top surface narrowing downwardly towards said opening of said sidewall; and
    when in said tensioned position said conical top surface of said flange is in a substantially perpendicular position relative to the central axis of said opening.

9. The container as in claim 8 further including a sealing member, wherein a portion of said sealing member is metallic.

10. The container as in claim 9 further including a closure.

11. A method of attaching a sealing member to a container comprising the steps of:
    filling product into a container having a flange outwardly projecting from a sidewall, wherein said flange includes an outer portion and an inner portion, wherein said inner portion is more proximal to said sidewall than said outer portion;
    progressively engaging a sealing member from said outer portion to said inner portion of said flange thereby pivoting said flange from a first position to a second position; and
    sealingly engaging said sealing member to said flange of said container.

12. The method of claim 11 wherein said sealing member is bonded to said flange.

13. The method of claim 11 further including the step of translationally moving said flange of said container relative to said sealing member as said sealing member progressively engages said flange.

14. The method of claim 11 further including the step of squeezing product inwardly into said container while engaging said sealing member with said flange.

15. The method of claim 11 wherein said flange is conical in shape when in said first position.

16. The method of claim 11 wherein said flange is in a tensioned state when in said second position.

17. The method of claim 11 wherein said flange pivots out of said second position to a third position that is in the direction towards said first position after said sealing member is sealingly engaged to said flange.

18. The method of claim 11 wherein said flange pivots from the range greater than 0 degrees to about 90 degrees.

19. The method of claim 11 wherein said container is either thermoformed, injected, or compression molded.

20. The method of claim 11 further comprising the step of at least one of a retort or aseptic process.

21. The method of claim 11 wherein said sealing member is a film.

22. The method of squeezing contaminants inwardly into a container comprising the steps of:
    providing a container, wherein said container includes a flange outwardly projecting from a sidewall by a hinge;
    filling said container with a product;

providing a sealing member;

progressively pivoting said flange about said hinge between a first position and a second position; and inwardly increasing a contact surface between said sealing member and said container flange when progressively pivoting said flange from said first position to said second position.

23. The method of claim 22 further comprising the step of sealing said sealing member to said container flange.

24. The method of claim 23 wherein said flange pivots out of said second position to a third position that is in the direction towards said first position after sealing said sealing member to said container flange.

25. The method of claim 22 wherein the step of progressively pivoting said flange about said hinge between said first position and said second position includes translationally moving at least one of said flange or said sidewall.

26. The method of claim 22 wherein said contact surface extends from an outer edge to an inner edge of said flange.

27. The method of claim 22 wherein said flange is continuous about said sidewall.

28. The method of claim 22 wherein said sealing member includes a metallic material, and further comprising the step of induction heat sealing said sealing member to said container flange.

29. A method of attaching a sealing member to a container comprising the steps of:

filling product into a container having a flange outwardly projecting from a sidewall, wherein said flange includes an outer portion and an inner portion, wherein said inner portion is more proximal to said sidewall than said outer portion;

progressively engaging a combined closure and sealing member from said outer portion towards said inner portion of said flange thereby pivoting said flange from a first position to a second position, wherein said sealing member is at least partially metallic; and induction heat sealing said sealing member to said flange of said container.

30. The method of claim 29 further comprising the step of peeling at least a portion of said sealing member by at least a portion of said closure.

31. The method of claim 29 further comprising the step of combining said closure with said sealing member.

32. The method of claim 29 wherein when progressively pivoting said flange from said first position to said second position a contact surface between said sealing member and said flange increases.

* * * * *